Patented Mar. 5, 1946

2,396,125

UNITED STATES PATENT OFFICE 2,396,125

SIMULATED PATENT LEATHER

John R. Price, Jackson Heights, N. Y., assignor to Carbide and Carbon Chemicals Corporation, a corporation of New York No Drawing. Application October 1, 1942, Serial No. 460,428

1 Claim. (Cl. 154—46)

This invention relates to a new type of simulated patent leather which is excellently suited to serve in the many applications where coated leather, of the type known as patent leather, is now employed.

In the commercial manufacture of coated leather of this type, the tanned skin is tightly stretched and covered with several layers of linseed oil varnish, one or more of which contain a pigment such as lamp black or Prussian blue. After the final coating, the skin is either exposed to sunlight or to artificial light which contains a large proportion of ultra-violet rays to complete the process. This exposure to light harms the leather, and is very costly because of the labor required and the investment in material tied up during the exposure period, but it has heretofore been found necessary for the preparation of the best quality patent leather. It is well known that the usual patent leathers do not wear well and have other very noticeable defects. Among these are loss of flexibility with age, increasing brittleness as the temperature drops so that cracking takes place, and a tendency to become sticky or tacky in hot and humid weather.

According to this invention, a simulated patent leather is produced which by actual test has much greater wearing qualities than conventional types of coated leather, and which does not crack in cold weather or become tacky in hot weather. In addition, this new product may be produced in a very short time, since time consuming coating operations are not required.

The new product is characterized by a high gloss, measured by a method hereinafter described, which is several times as great as that of patent leather, and it is useful in the manufacture of various articles, such as shoes, handbags, wallets, belts, luggage, decorative bows, ornaments, book bindings, heel covers, covers for optical instruments, binoculars, and cameras, and decorative covers of all types. The new product is strong and flexible, elastic and resilient; having a tensile strength of 1500 to 3500 pounds per square inch and an elongation of from 150 to 300%. In addition, the product retains its flexibility at low temperatures and it is non-tacky over a wide range of temperatures. The new simulated patent leather possesses a distinct advantage over other types of patent leather, in that it is extensible under stress and returns slowly to its original shape after deformation within its elastic limit. This property provides comfort to the wearer of apparel, such as belts, made from the new material. However, the simulated patent leather of this invention may be made in non-extensible form, and this is of advantage in the construction of shoes where adequate support for the foot must be provided, and some degree of moisture absorption must be secured. This latter form of the product may be made by laminating a film of the new product to a non-extensible, or only slightly extensible, backing material.

The simulated patent leathers of the invention are composed of elastic gels having approximately linear deformation when subjected to stress below their breaking point. These gels are composed of colloidal dispersions of liquid plasticizers with certain types of vinyl resins. In order to secure gels of adequate mechanical strength and free from tackiness, it is essential that the vinyl resin be of a specified type, and desirable products are obtained employing a conjoint polymer of vinyl chloride with vinyl acetate, having an average macromolecular weight in excess of 15,000, and preferably above 18,000, and having a combined vinyl chloride content ranging from about 85% to 97% by weight of the polymer. The molecular weights specified herein are the average of the fractions of various molecular weights comprising the polymer, and they are determined from the viscosity of dilute solutions of the resin according to Staudinger's method. The proportion of plasticizer which is incorporated with these vinyl resins in order to secure elastic gels having adequate flexibility, elongation, and mechanical strength is from about 20 to 45% by weight of the total amount of resin and plasticizer. Products having greater amounts of the plasticizer within this range have greater flexibility and elongation, whereas products containing smaller amounts of plasticizer have higher tensile strength.

These gels are thermoplastic and become semifluid on heating. They may be formed by working the resin and plasticizer, along with added ingredients, on a heated roll mill until a homogeneous colloidal mass is obtained.

According to this invention, I have found that, when small amounts of pigments or dyes are dispersed in such elastic gels, and the heated gel is pressed against a highly polished surface, such as highly polished chromium plated metal platens, a finish of high gloss approaching the reflective properties of glass is obtained.

Sheets produced in this manner bear a very close resemblance to patent leather, and the texture and feel of the surface is more attractive to many than that of patent leather. There appears to be greater friction between the hand and the surface of the new simulated patent leather, which makes articles carried carried in the hand, such as handbags, less likely to slip. Unlike the substitutes for patent leather now on the market, which consist of nitrocellulose lacquers coated on a sheeting made from cellulose fibers impregnated with rubber latex, the new simulated patent leather will not crack even after long usage. Moreover, the new simulated patent leather, by comparative tests, will resist cracking many times longer than even the conventional type of patent leather formed by coating leather with lacquers. Articles made from the new compositions resist moisture and perspiration, do not stain, and are readily cleaned with a dry cloth or with mild soap and water.

The resistance of this simulated patent leather to cracking, despite its smooth polished surface, appears unique in the field of plastic compositions, because smooth surfaces formed from thermoplastic coatings applied to a base either by lacquering or calendering, contain surface strains which accelerate the cracking of the surface on repeated flexing.

The comparative resistance to cracking of the new simulated patent leather, as compared to the conventional patent leather, has been measured by means of a fatigue testing machine. This machine flexes and straightens strips of each material at the rate of 115 bends per minute with a radius of bend at the sharpest point of crease of 0.045 inch. The results below give the number of cycles each material withstood before cracking.

| Material | Fatigue |
|---|---|
| | Cycles |
| Elastic gel simulated patent leather | 4,000,000 |
| Coated leather of patent type— | |
| Full grain calfskin | 200,000 |
| Full grain cowhide | 300,000 |
| Snuffed grain cowhide | 6,000 |

The comparative specular gloss of the new simulated patent leather, as compared to black glass and to conventional patent leather, has been accurately determined. This was done by measuring the percentage fraction of incident light which is reflected at a corresponding angle when the surface is illuminated by a parallel beam of light of daylight quality at an angle of 30° to the surface.

| Material | Specular gloss |
|---|---|
| | Percent |
| Black glass | 9.3 |
| Elastic gel simulated patent leather | 3.9 |
| Coated leather of patent type— | |
| Full grain calfskin | 0.5 |
| Full grain cowhide | 0.7 |
| Snuffed grain cowhide | 1.3 |

One of the most useful embodiments of the present invention consists of simulated patent leather formed by laminating the elastic gel to a fibrous backing material, such as cloth, formed of cotton, wool, rayon, nylon, or synthetic vinyl resin fibers of the type described in Rugeley et al. Patent 2,161,766. Particularly suited as backing material are, closely woven fabrics, such as coutil cloth. Very good adhesion between the cloth and the elastic gel may be obtained by subjecting a sheet of the gel and the cloth to heat and pressure, the glossy finish being simultaneously imparted to the elastic gel. Better adhesion is secured, if the sheet of elastic gel is reduced in thickness during the pressing operation and caused to flow slightly over the contours of the cloth. The adhesion may also be increased by using adhesives, such as butadiene copolymers and polyvinyl esters, between the elastic gel and the cloth backing. The laminated product is very useful in the construction of shoes, and may be employed for foxing, tipping, and in the construction of the entire upper. By actual wearing tests, shoes containing the simulated patent leather as part of the uppers have been worn over ten times as long as similar shoes made from patent leather without cracking of the finish. It is a feature of the present composition that it represents the first type of simulated patent leather that is resistant to cracking during use. The surface of the shoes is highly resistant to scuffing and scratching, and the shoes retain their original lustrous and glossy appearance. The shoes do not stain and are readily cleaned by wiping with a dry cloth. The elastic gel is not affected by moisture, and will not become stiff if wet.

The product having the cloth backing is very flexible, but it is elastic only to the extent the cloth will stretch. This provides support for the foot, and greater comfort to the wearer in that the cloth will absorb perspiration. The new material can be fashioned in a variety of styles for foot wear. The product may be perforated, or woven in strip form. Likewise, it may be made in all colors, including white, depending on the pigment or coloring material which is present.

The following formulation is typical of those which may be employed for the production of the elastic gel used in making the simulated patent leather:

| | Per cent |
|---|---|
| Conjoint polymer vinyl chloride-vinyl acetate resin, containing 95% vinyl chloride. Average molecular weight about 22,000 | 56.0 |
| Conjoint polymer vinyl chloride-vinyl acetate resin containing 87% vinyl chloride. Average molecular weight about 12,000 | 6.0 |
| Heat stabilizer | 1.5 |
| Lubricant | 1.0 |
| Plasticizer | 35.0 |
| Pigment | 0.5 |
| | 100.0 |

In this example, a small amount of conjoint polymer resin of lower molecular weight is added to improve the milling characteristics of the stock when it is being mixed on a mill. However, the addition of such resin is not essential, and, it will be noted, the average molecular weight of the combined resins employed is about 21,000.

The heat stabilizers are added to increase the stability of the composition to heat during processing. Suitable stabilizers include basic compounds, such as lead stearate, litharge and other oxides of lead, calcium ethyl acetoacetate and calcium stearate. As lubricants there may be employed such materials as light petroleum distillates, waxes, cocoa butter, and pale blown castor-oil.

Suitable plasticizers include dioctyl phthalate, dioctyl endo-methylene hexohydrophthalate, dibutyl sebacate, di-(beta-butoxyethyl) phthalate, dioctyl sebacate, triethylene glycol dioctoate, methyl acetyl ricinoleate, and tricresyl phosphate.

The pigment is varied according to the color desired. For black compositions, carbon black is preferably employed; titanium dioxide is suitable as a white pigment; chromic oxide as a green pigment, and phthalo-cyanine blue as a blue pigment.

In forming the elastic gel, the ingredients of the composition are mixed together in a dough-type mixer at 120° C. for approximately 10 to 12 minutes. The hot fused mass is then further mixed on a hot two-roll mill at about 110° to 150° C. until a homogeneous, colloidal combination of resin and plasticizer is obtained. The hot plastic mass is then calendered into sheets having a thickness somewhat greater than that of the finished product.

In forming the simulated patent leather sheets, the calendered sheets are placed in a hydraulic press, having one or two highly polished press platens, such as highly polished chromium plated press platens, depending on whether a finish of high specular gloss is desired on one or both sides of the sheet. The platens are heated at about 160° C. and a pressure of about 175 pounds per square inch is maintained on the sheeting. The sheeting is pressed until a slight reduction in thickness has occurred, which is accompanied by a faithful reproduction of the highly polished press platens on the surface of the plastic sheet. The finished sheet may be obtained in thickness varying from 0.001 to 0.10 inch. A very serviceable thickness for most purposes is about 0.020 inch.

If a laminated product is desired, the calendered sheet of the elastic gel is placed over coutil cloth, or other backing material, leaving a slight margin of cloth to be covered by the flow of the plastic sheet during the pressing operation. The pressing procedure is similar to that described above. In order to increase the adhesion between the gel and the cloth, a butadiene copolymer with styrene or acrylic nitrile, may be used as an adhesive between the elastic sheet and the backing material. A solution of this adhesive in the unvulcanized state, in a suitable solvent, such as ethyl acetate, and containing vulcanizing and accelerating agents, is applied to the surfaces to be joined, and upon curing of the butadiene copolymer during the laminating operation, a very strong bond between the cloth and the elastic gel is formed.

It is to be understood that the above example is illustrative only, and that the quantities of resin and plasticizer designated, as well as the types of plasticizers themselves, may be varied within the limits specified in order to secure products of varying elasticity and flexibility. Also, the quantities of pigment or dyes may be varied, but in general from 0.1 to 5.0% will be sufficient to provide a product of a highly lustrous gloss. The presence of a pigment or dye, or a combination of the two, permits a much higher gloss to be obtained by press-polishing than would be the case were no pigment or dye included. In order to secure this result, it is essential that the pigment be finely dispersed throughout the elastic gel. Carbon black is the preferred pigment because of the fine dispersions which may be secured. Other modifications of the composition will be apparent to those skilled in the art and are included within the scope of the invention.

I claim:

Simulated patent leather having a fatigue resistance before cracking higher than about 3,000,000 cycles, and having a polished surface with a specular gloss of at least 3% reflection comprising in sheet form an elastic gel having a tensile strength in excess of 1500 pounds per square inch and an approximately linear deformation when subjected to stress below its breaking point, said elastic gel having approximately the following composition:

| | Per cent |
|---|---|
| Conjoint polymer of vinyl chloride with vinyl acetate resin, containing about 95% vinyl chloride and having an average molecular weight of about 22,000 | 56.0 |
| Conjoint polymer of vinyl chloride with vinyl acetate resin, containing about 87% vinyl chloride and having an average molecular weight of about 12,000 | 6.0 |
| Heat stabilizer | 1.5 |
| Lubricant | 1.0 |
| Plasticizer | 35.0 |
| Pigment | 0.5 |
| | 100.0 |

JOHN R. PRICE.